(12) United States Patent
Niitsuma et al.

(10) Patent No.: US 8,056,973 B2
(45) Date of Patent: Nov. 15, 2011

(54) COUPLING MECHANISM FOR HEADREST OF VEHICLE SEAT

(75) Inventors: Kenichi Niitsuma, Shioya-gun (JP); Hirooki Negishi, Shioya-gun (JP); Jinichi Tanabe, Shioya-gun (JP); Koji Sano, Wako (JP); Koji Uno, Wako (JP); Tatsuya Terauchi, Wako (JP); Tomoki Matsumoto, Wako (JP)

(73) Assignees: TS Tech Co., Ltd., Saitama (JP); Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/077,295

(22) Filed: Mar. 31, 2011

(65) Prior Publication Data

US 2011/0193377 A1 Aug. 11, 2011

Related U.S. Application Data

(62) Division of application No. 12/279,766, filed as application No. PCT/JP2005/013468 on Jul. 22, 2005.

(51) Int. Cl.
*B60N 2/42* (2006.01)
*B60N 2/427* (2006.01)
(52) U.S. Cl. .................................. 297/216.12
(58) Field of Classification Search .............. 297/216.12
See application file for complete search history.

(56) References Cited

U.S. PATENT DOCUMENTS

| | | | |
|---|---|---|---|
| 4,632,454 A | 12/1986 | Naert | |
| 5,076,643 A | 12/1991 | Colasanti et al. | |
| 6,139,102 A | 10/2000 | von Möller | |
| 6,250,714 B1 * | 6/2001 | Nakano et al. | 297/216.12 |
| 6,260,921 B1 | 7/2001 | Chu et al. | |
| 6,375,262 B1 | 4/2002 | Watanabe | |
| 6,568,753 B1 | 5/2003 | Watanabe | |
| 6,702,377 B2 | 3/2004 | Nakano | |
| 6,783,177 B1 | 8/2004 | Nakano | |
| 6,789,845 B2 * | 9/2004 | Farquhar et al. | 297/216.12 |
| 6,918,633 B2 | 7/2005 | Forkel et al. | |
| 6,955,397 B1 * | 10/2005 | Humer | 297/216.12 |
| 7,044,544 B2 | 5/2006 | Humer et al. | |
| 7,052,087 B2 | 5/2006 | McMillen | |
| 7,077,472 B2 | 7/2006 | Steffens, Jr. | |
| 7,104,602 B2 | 9/2006 | Humer et al. | |
| 7,270,374 B2 | 9/2007 | Moriggi | |
| 7,393,052 B2 * | 7/2008 | Humer et al. | 297/216.12 |
| 7,644,987 B2 * | 1/2010 | Humer et al. | 297/216.12 |
| 2004/0155496 A1 * | 8/2004 | Farquhar et al. | 297/216.12 |

(Continued)

FOREIGN PATENT DOCUMENTS

DE 100 46 391 C1 4/2002

(Continued)

*Primary Examiner* — Rodney B White
(74) *Attorney, Agent, or Firm* — Drinker Biddle & Reath LLP

(57) ABSTRACT

A vehicle seat is provided comprising a seat back frame having right and left side frames, a headrest for supporting a head of a seat occupant, and a back-and-forth movable body provided inside a backrest that is positioned at a rear of the seat occupant, wherein a backward movement of the back-and-forth movable body forwardly moves the headrest to support the head of the seat occupant. The back-and-forth movable body is attached to each side frame through a link member and is provided with a backward protrusion protruding backward, and the backward protrusion extends laterally.

54 Claims, 6 Drawing Sheets

U.S. PATENT DOCUMENTS

| | | |
|---|---|---|
| 2006/0006709 A1* | 1/2006 | Uno et al. .............. 297/216.12 |
| 2009/0001785 A1 | 1/2009 | Swan et al. |

FOREIGN PATENT DOCUMENTS

| | | |
|---|---|---|
| DE | 102 12 828 C1 | 6/2003 |
| JP | 7-75608 A | 3/1995 |
| JP | 10-119619 A | 5/1998 |
| JP | 10-138811 A | 5/1998 |
| JP | 10-138812 A | 5/1998 |
| JP | 10-138814 A | 5/1998 |
| JP | 11-034708 A | 2/1999 |
| JP | 11-192869 A | 7/1999 |
| JP | 11-206506 A | 8/1999 |
| JP | 2000-201769 A | 7/2000 |
| JP | 2000-210157 A | 8/2000 |
| JP | 2000-211410 A | 8/2000 |
| JP | 2003-341401 A | 12/2003 |

\* cited by examiner

COUPLING MECHANISM FOR HEADREST OF VEHICLE SEAT

CROSS-REFERENCE TO RELATED APPLICATIONS

This application is a divisional application of U.S. patent application Ser. No. 12/279,766, filed Jun. 18, 2009, which is a PCT national stage entry of international patent application no. PCT/JP2005/13468, filed Jul. 22, 2005. The contents of these applications are herein incorporated by reference.

BACKGROUND

The present invention relates to a coupling mechanism for a headrest of a vehicle seat, and more particularly to a coupling mechanism for moving the headrest forward when a forward external force acts on a car body as a result of rear end collisions or the like.

Conventionally, there is known from Japanese Patent Application Laid-Open No. 10-119619 a vehicle seat having a headrest provided in a backrest, a movable member provided inside of the backrest, and a coupling mechanism for coupling the headrest and the movable member mechanically, in which, when a vehicle seat occupant moves backward relative to the vehicle seat due to rear collisions or the like, the movable member is pushed by the occupant to move backward, and the backward movement of the movable member moves the headrest forward by way of the coupling mechanism.

The coupling mechanism of the prior art is disposed substantially at the backside of a cushion of the backrest, and thus the cushion performance may be lowered. That is, the coupling mechanism is provided at a position overlapping the vehicle seat occupant in the front-to-back direction, and thus the cushion design is restricted.

The movable member in the prior art is narrow in its movable range, and the distance of moving the headrest forward is short, and means for compensating for lack of distance is difficult.

SUMMARY

It is hence an object of embodiments of the invention to provide a coupling mechanism for a headrest capable of amplifying the small moving amount of the movable member and transmitting the movement to the headrest. It is another object of embodiments of the invention to provide a coupling mechanism for a headrest capable of amplifying the moving amount of the movable member with a simple configuration. It is still another object of the invention to provide a coupling mechanism for a headrest not interfering with the cushion of the backrest substantially.

Therefore, a vehicle seat is provided comprising a seat back frame having right and left side frames, a headrest for supporting a head of a seat occupant, and a back-and-forth movable body provided inside a backrest that is positioned at a rear of the seat occupant, wherein a backward movement of the back-and-forth movable body forwardly moves the headrest to support the head of the seat occupant. The back-and-forth movable body is attached to each side frame through a link member and is provided with a backward protrusion protruding backward, and the backward protrusion extends laterally.

A vehicle seat is also provided comprising a seat back frame having right and left side frames, a headrest for supporting a head of a seat occupant, and a back-and-forth movable body provided inside a backrest that is positioned at a rear of the seat occupant, wherein a backward movement of the back-and-forth movable body forwardly moves the headrest to support the head of the seat occupant. The back-and-forth movable body is attached to each side frame through a link member and is provided with a backward protrusion protruding backward in at least an end part in a vertical direction, and the backward protrusion extends laterally.

A vehicle seat is also provided comprising a seat back frame having right and left side frames, a headrest for supporting a head of a seat occupant, and a back-and-forth movable body provided inside a backrest that is positioned at a rear of the seat occupant, wherein a backward movement of the back-and-forth movable body forwardly moves the headrest to support the head of the seat occupant. The back-and-forth movable body is attached to each side frame through a link member and is provided with first and second backward protrusions protruding backward, and the first and second backward protrusions extend laterally and are arranged in parallel with each other.

A vehicle seat is also provided comprising a seat back frame having right and left side frames, a headrest for supporting a head of a seat occupant, and a back-and-forth movable body provided inside a backrest that is positioned at a rear of the seat occupant, wherein a backward movement of the back-and-forth movable body forwardly moves the headrest to support the head of the seat occupant. The back-and-forth movable body is attached to each side frame through a link member, provided with a first backward protrusion protruding backward in an upper end part thereof, and provided with a second backward protrusion protruding backward in a lower end part thereof, and the first and second backward protrusions extend laterally.

BRIEF DESCRIPTION OF THE DRAWINGS

An embodiment of the invention is shown in the following figures.

DETAILED DESCRIPTION

Figure 1:
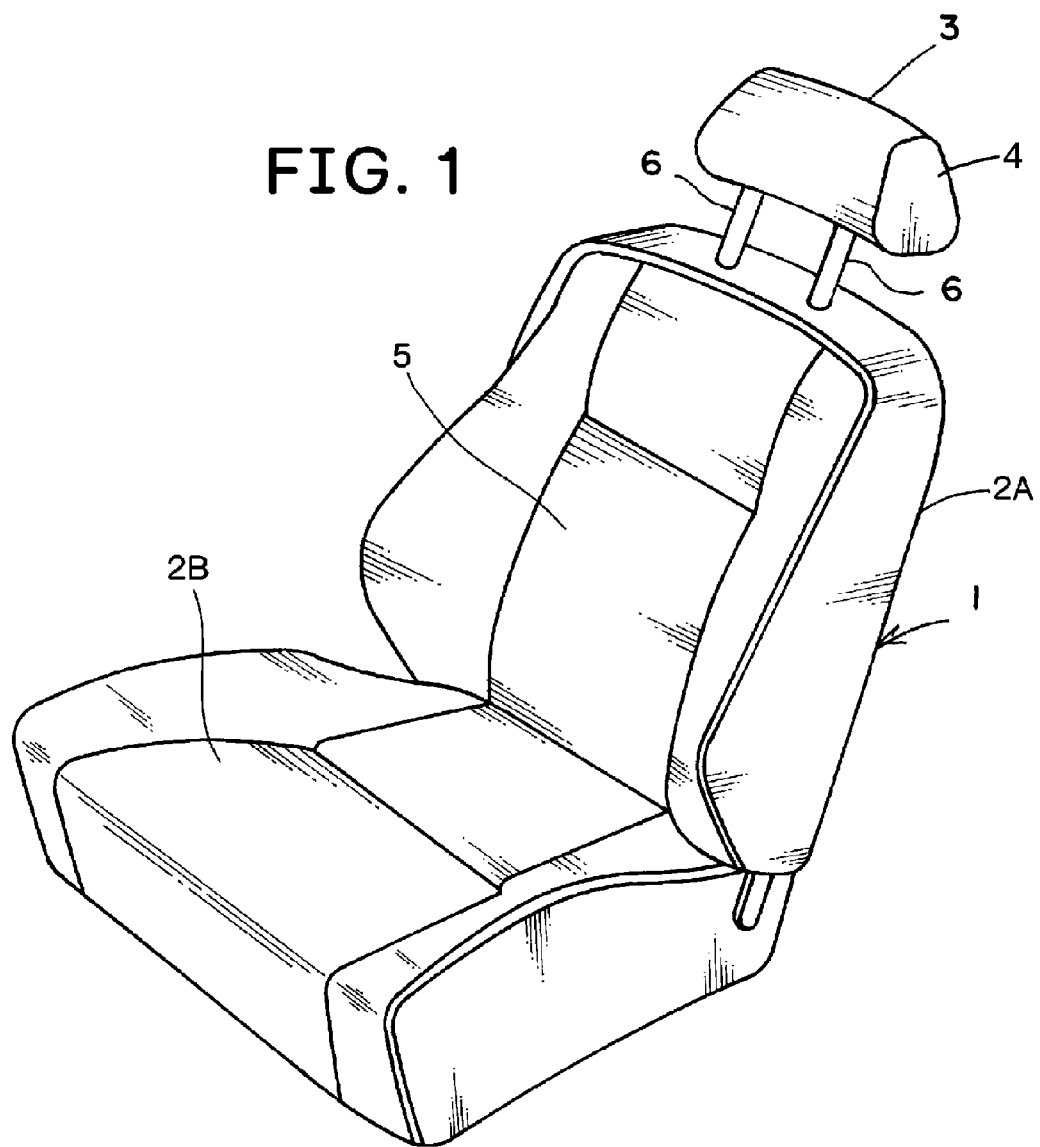
FIG. 1 is an overall perspective view of a vehicle seat.

An embodiment of the invention will be described with reference to the accompanying drawings. A vehicle seat 1 of the invention has a backrest 2A, a seat bottom 2B, and a headrest 3 having a head support 4 is provided in an upper part of the backrest 2A. A backrest frame 16 of the backrest 2A has a square frame shape, including a pair of side frames 40, each having an inward extension 40*a* and outwardly recessed portion 50, an upper frame 41, and a lower frame 42.

Near the upper frame 41, an upper movable member 10 (headrest support member) movable laterally to the backrest frame 16 is disposed. Vertical pillar supports 11 for inserting the lower parts of pillars 6 of the headrest 3 are fixed in the movable member 10. The pillars 6 are supported by the pillar supports 11 to be adjustable in height. The movable member 10 also has an outward extension 12*a*, and a forward extension 12*b*, as well as a protrusion 14 having an anteroposterior extension, and a forward bent portion 14*a*.

Figure 2:
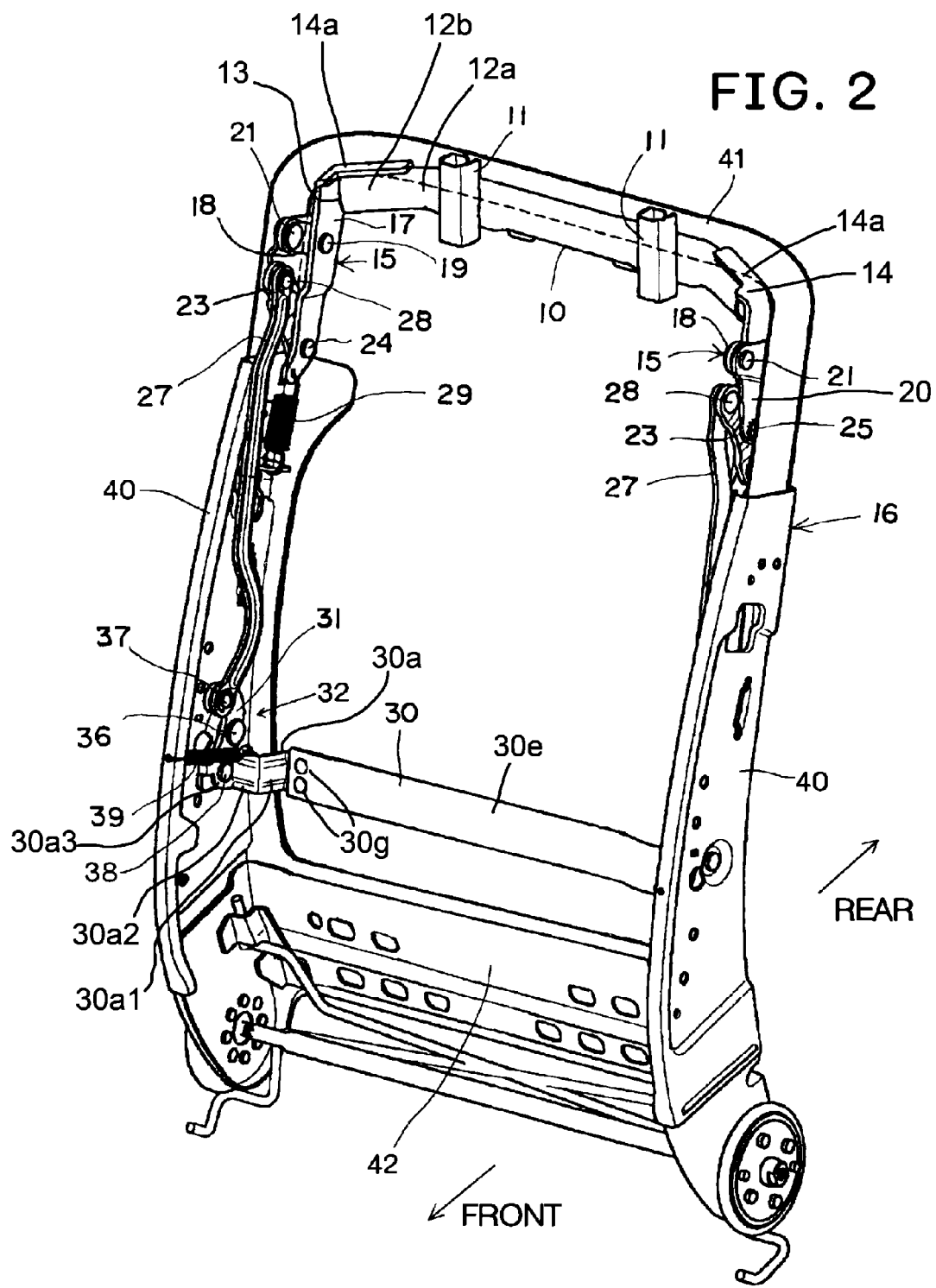
FIG. 2 is a perspective view showing a backrest frame and a part of a coupling mechanism for a headrest.
Figure 3:
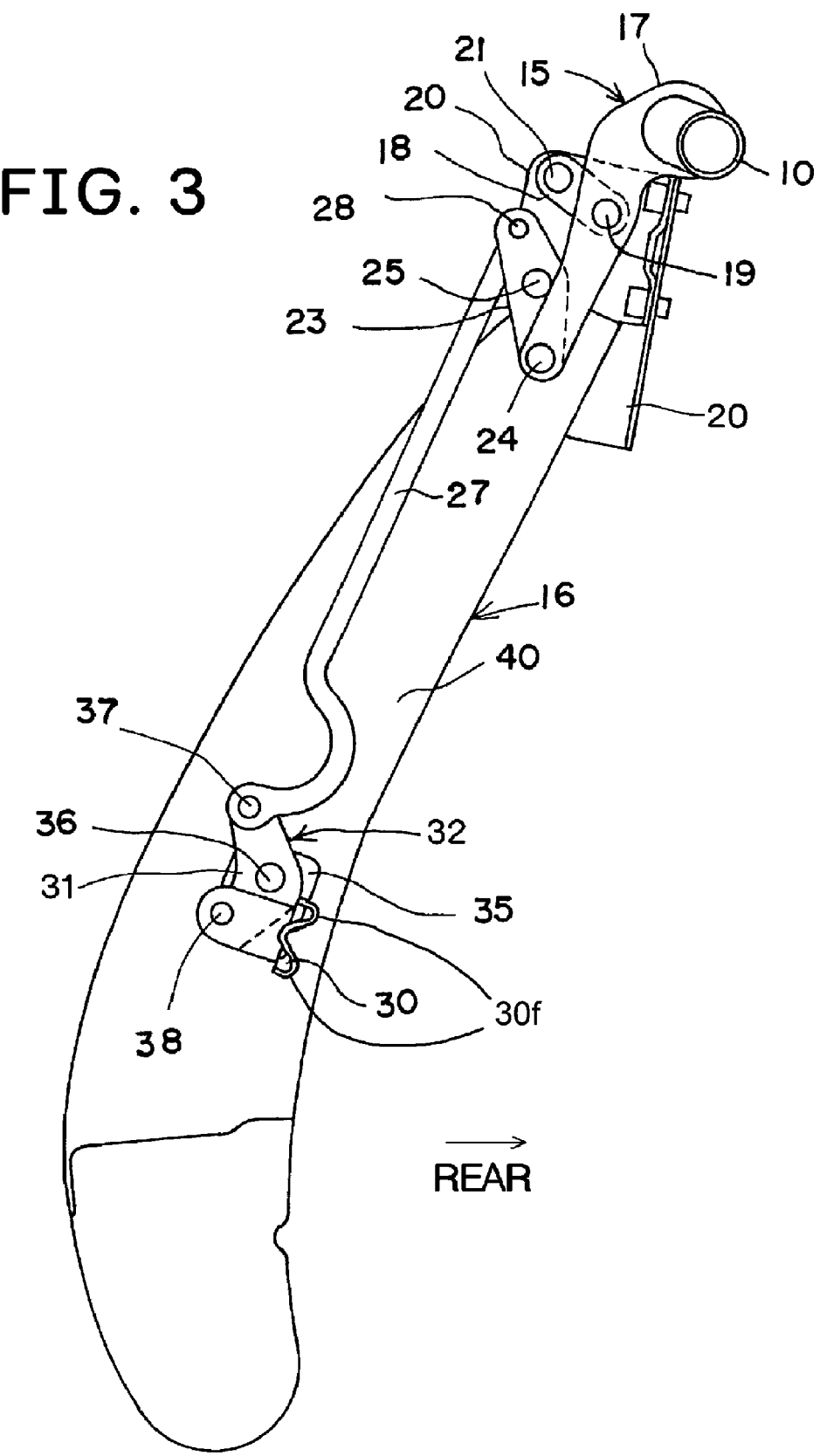
FIG. 3 is a side view of the coupling mechanism for a headrest.
Figure 4:
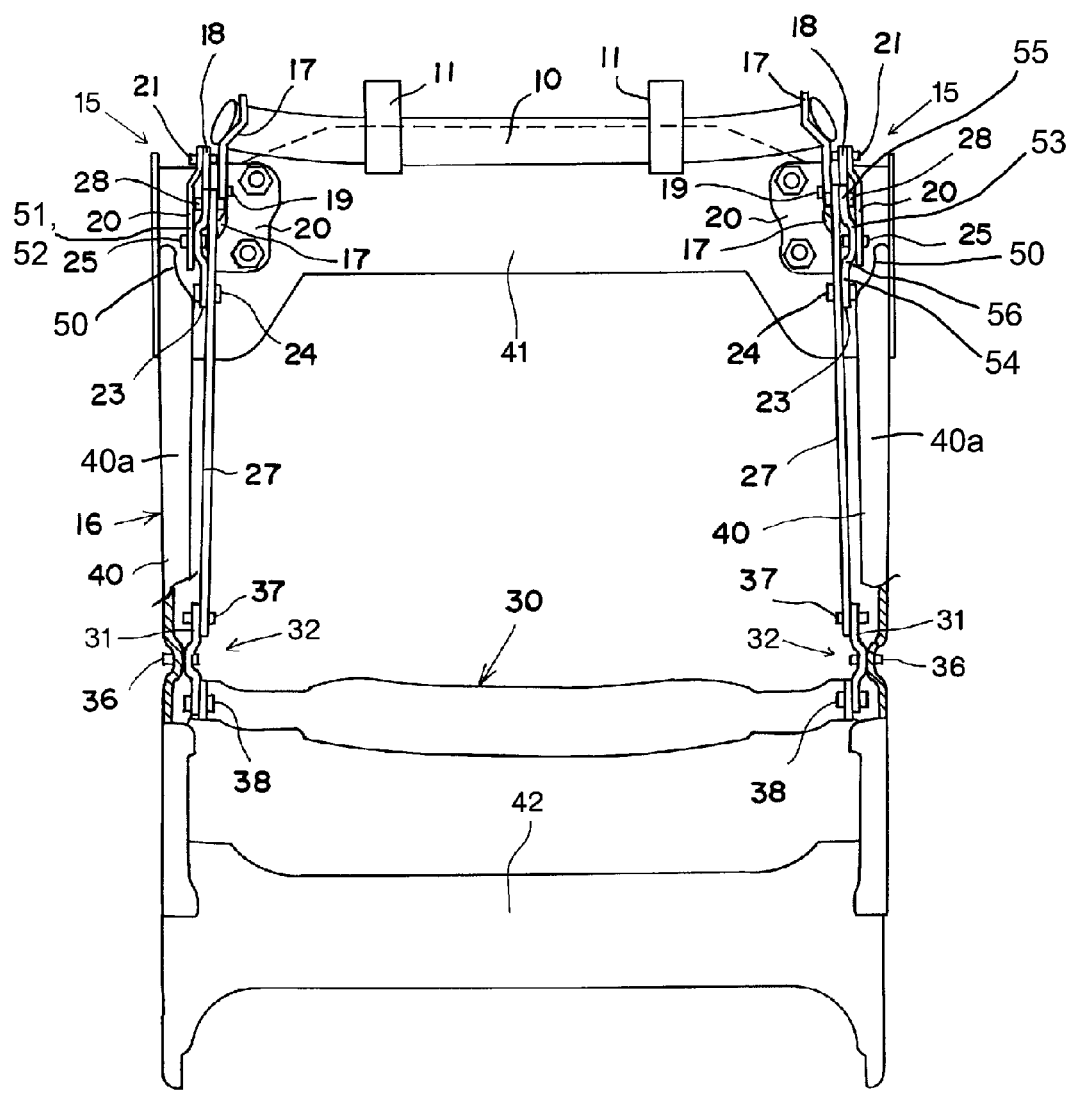
FIG. 4 is a front view of the backrest frame and the coupling mechanism for a headrest.
Figure 7:
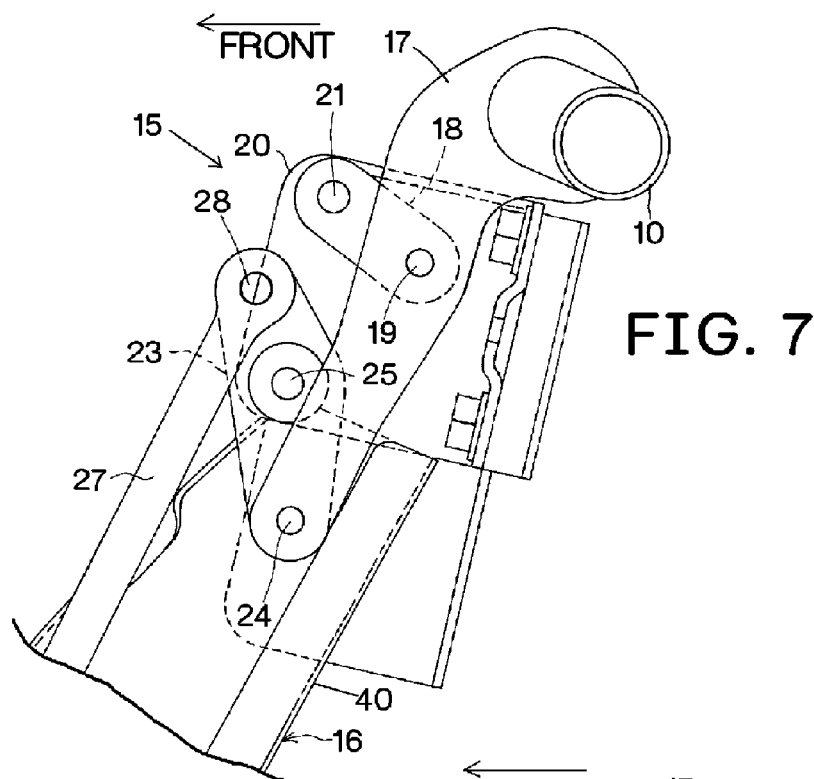
FIG. 7 is a magnified side view of an upper link mechanism of the coupling mechanism.

Both right and left sides of the upper movable member 10 are attached to the backrest frame 16 by way of an individual upper link mechanism 15. Each upper link mechanism 15 has a long first link 17 (downward extension), an arm 18 (second link member), and a second link 23 (first link member) as shown in FIGS. 2, 3 and 7. The end part of the upper movable member 10 is fixed to an upper part of the first link 17, and the arm 18 is rotatably pivoted on an L-shaped bracket 20 (bracket, bracket member) fixed in the upper part of the backrest frame 16 by way of a shaft 21 (second link support shaft). An intersection 13 exists between the first link 17 and the forward extension 12*b*. The second link 23 is rotatably pivoted on the bracket 20 by way of a shaft 25 (first link support shaft). The leading end of the arm 18 is pivoted on the vertical intermediate position of the first link 17 by way of a shaft 19 (second coupling shaft), and the leading end of the second link 23 is pivoted on the lower part, of the first link 17 by way of a shaft 24 (first coupling shaft). The other end of the second link 23 is pivoted on the upper part of a long coupling rod 27 by way of a shaft 28. The bracket 20 has a link support portion 51 with a link support surface 52. The second link 23 has a bracket attachment 53, a first extension 54 and a second extension 55. The second link 23 also has a bent portion 56.

The first link 17, the arm 18 and the second link 23 of the upper link mechanism 15 are preliminarily assembled in, preferably, the bracket 20. As a result, the bracket provided with the link mechanism can be easily assembled in the backrest frame 16 as a unit module. The bracket provided with the link mechanism makes it easy to manage storage parts, and to replace parts in maintenance operations.

Figure 6:
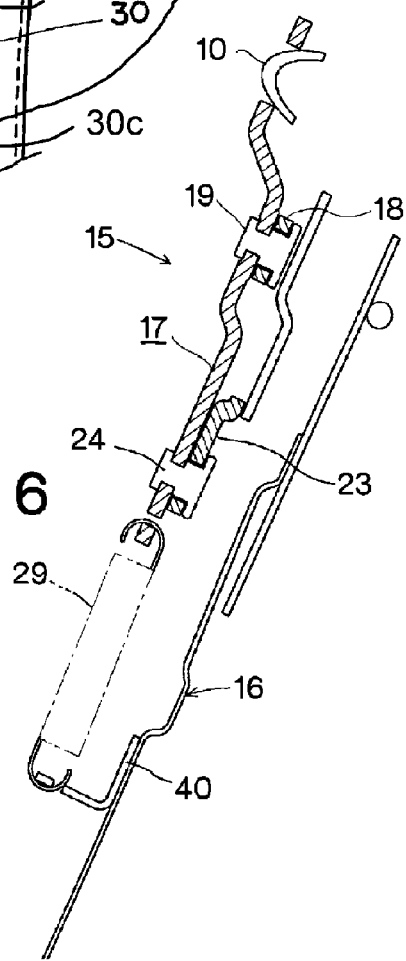
FIG. 6 is a sectional view of a first link of the coupling mechanism.

As shown in FIGS. 2 and 6, one end of an upper spring 29 is coupled to the lower part of the first link 17, and the other end of the upper spring 29 is coupled to the side frame 40. The first link 17 is usually held at a lower waiting position in FIG. 7 by an elastic force of the spring 29, and hence the headrest 3 is held at an ordinary position. When the first link 17 moves up to a position indicated by solid line in FIG. 8, the upper movable member 10 moves forward, and the headrest 3 is forced out forward.

Between the side frames 40, 40, a lower movable member 30, which may be a back-and-forth movable body or a sensing member, stretching laterally is disposed. The lower movable member 30 is pushed by a vehicle seat occupant and moved backward when the vehicle seat relatively moves forward of the occupant due to a rear end collision. Both sides of the lower movable member 30 are coupled to the ends of the lower link 31 (link member) of the lower link mechanism 32 by way of shafts 38 (coupling shafts). The lower movable member 30 comprises a plate-shaped portion 30*e* that connects to the shaft 38 via a coupling plate member 30*a* (also called a coupling member or end extension) through a first extension 30*a*1, second extension 30*a*2, and third extension 30*a*3. The lower movable member 30 also comprises a shaft member 30*g*. The other end of the lower link 31 is coupled to the lower part of the coupling rod 27 (transmission member) by way of a shaft 37. The lower link 31 is preferably a bell crank. The center of the lower link 31 is pivoted on a lower bracket 35 (bracket member) fixed to the side frame 40 by way of a shaft 36 (link support shaft).

As shown in FIG. 2, one end of the lower spring 39 is coupled to the lower movable member 30, and the other end of the lower spring 39 is coupled to the side frame 40. The lower movable member 30 is held at a forward ordinary position by the elastic force of the spring 39, and when a rear end collision occurs, it is pushed by the vehicle seat occupant and moved backward by resisting the elastic force of the spring 39.

Figure 5:
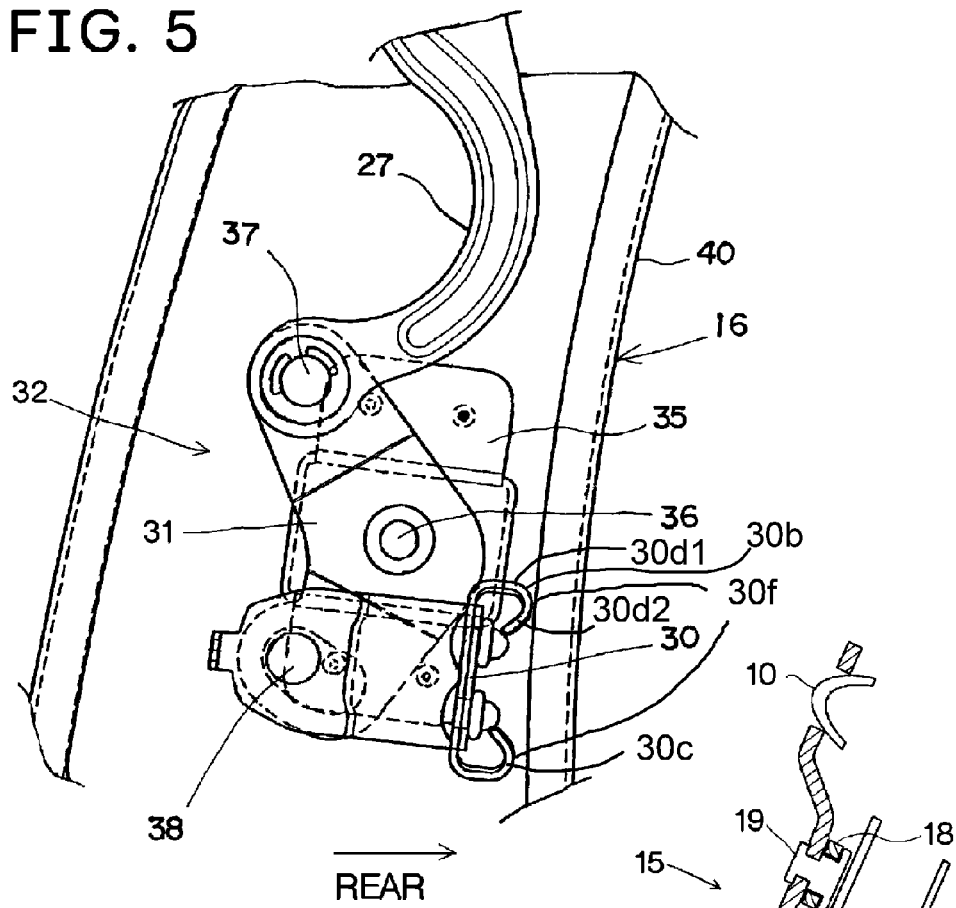
FIG. 5 is a magnified side view of a lower link mechanism of the coupling mechanism.
Figure 8:
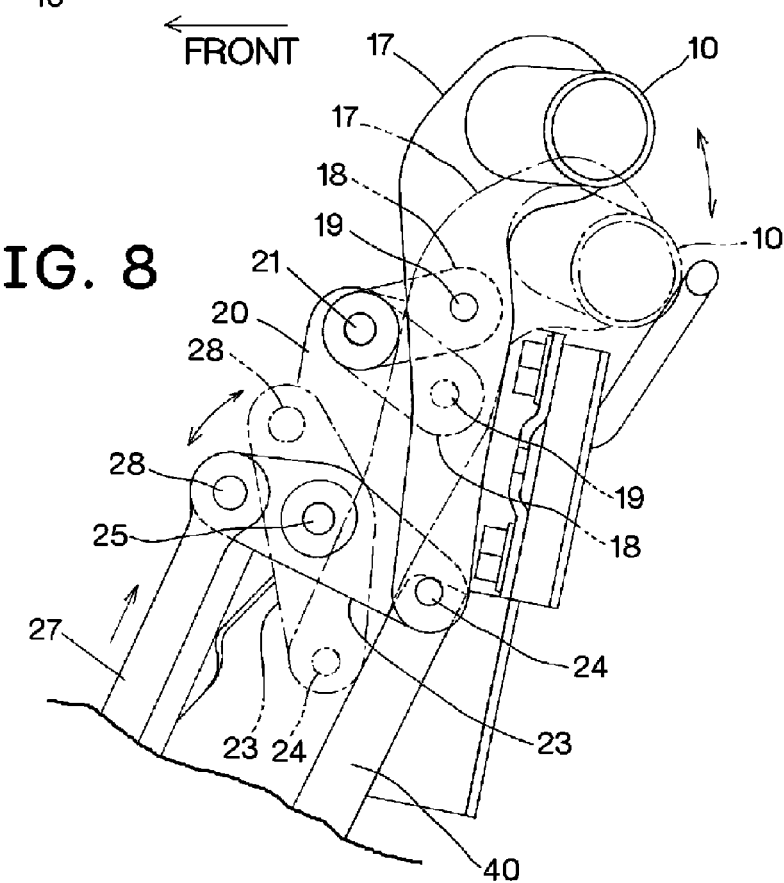
FIG. 8 is a magnified side view showing the first link elevated from the state in FIG. 7.

In FIGS. 3 and 5, the backward movement of the lower movable member 30 causes the lower link 31 to rotate counterclockwise about the shaft 36, and causes the coupling rod 27 to be pulled downward. As a result, the second link 23 rotates counterclockwise about the shaft 25, and moves the first link 17 upward by resisting the elastic force of the upper spring 29. At this time, the distance between the shaft 25 and shaft 28 is shorter than the distance between the shaft 25 and shaft 24. Thus, the second link 23 amplifies the moving amount of the coupling rod 27 (lower movable member 30) to transmit the movement to the first link 17, the upper part of the first link 17 is guided by the arm 18 and moved substantially forward as shown in FIG. 8, and thereby the headrest 3 is moved forward by way of the upper movable member 10 so that a cervical spine of the vehicle seat occupant is protected in the event of a rear end collision.

Thus, the upper link mechanism 15 of this embodiment of the invention has a function of moving the headrest 3 largely forward with a small moving amount of the lower movable member 30. The lower movable member 30 comprises backward protrusions 30*f*. The backward protrusions 30*f* may comprise a first backward protrusion 30*b* (upper backward protrusion) and a second backward protrusion 30*c* (lower backward protrusion). These each may comprise a first bent portion 30*d*1 and a second bent portion 30*d*2.

The side frame 40 of the backrest frame 16 is formed of a metal plate having a specified width in the front-to-back direction, and the upper link mechanism 15, coupling rod 27, and lower link 31 are disposed adjacent to the side frame 40. In addition, the members of the upper link mechanism 15 and the lower link 31 are formed of plates substantially parallel to the side frame 40, and are supported by the shaft in the lateral direction. The upper movable member 10 substantially overlaps with the upper frame 41 of the backrest frame 16. Therefore, the mechanism for transmitting the movement of the lower movable member 30 to the headrest 3 does not substantially interfere with the cushion 5 of the backrest 2A. Hence, the transmission mechanism is operated smoothly, and decline of performance of the cushion 5 is prevented.

TABLE OF REFERENCE CHARACTERS

| | |
|---|---|
| 1 | vehicle seat |
| 2A | backrest |
| 2B | seat bottom |
| 3 | headrest |
| 4 | head support |
| 5 | cushion |
| 6 | pillars |
| 10 | upper movable member; headrest support member |
| 11 | pillar supports |
| 12a | outward extension |
| 12b | forward extension |
| 13 | intersection |
| 14 | protrusion |
| 14a | anteroposterior extension; forward bent portion |
| 15 | upper link mechanism |
| 16 | backrest frame |
| 17 | long first link; downward extension |
| 18 | arm; second link member |
| 19 | shaft; second coupling shaft |
| 20 | L-shaped bracket; bracket; bracket member |

-continued

TABLE OF REFERENCE CHARACTERS

| 21 | shaft; second link support shaft |
| 23 | second link; first link member |
| 24 | shaft; first coupling shaft |
| 25 | shaft; first link support shaft |
| 27 | long coupling rod |
| 28 | shaft |
| 29 | upper spring |
| 30 | lower movable member; back-and-forth movable body |
| 30a | coupling plate member; coupling member; end extension |
| 30a1 | first extension |
| 30a2 | second extension |
| 30a3 | third extension |
| 30b | first backward protrusion; upper backward protrusion |
| 30c | second backward protrusion; lower backward protrusion |
| 30d1 | first bent portion |
| 30d2 | second bent portion |
| 30e | plate shaped portion |
| 30f | backward protrusion |
| 30g | shaft member |
| 31 | lower link; bell crank; link member |
| 32 | lower link mechanism |
| 35 | lower bracket; bracket member |
| 36 | shaft; link support shaft |
| 37 | shaft |
| 38 | shaft; coupling shaft |
| 39 | spring |
| 40 | side frame |
| 40a | inward extension |
| 41 | upper frame |
| 42 | lower frame |
| 50 | outwardly recessed portion |
| 51 | link support portion |
| 52 | link support surface |
| 53 | bracket attachment |
| 54 | first extension |
| 55 | second extension |
| 56 | bent portion |

What is claimed is:

1. A vehicle seat comprising:
a seat back frame having right and left side frames;
a headrest for supporting a head of a seat occupant; and
a back-and-forth movable body provided inside a backrest that is positioned at a rear of the seat occupant, wherein a backward movement of the back-and-forth movable body forwardly moves the headrest to support the head of the seat occupant;
wherein:
the back-and-forth movable body is attached to each side frame through a link member and is provided with a backward protrusion protruding backward;
the backward protrusion extends laterally; and
each lateral end part of the back-and-forth movable body comprises:
a first extension extending forward;
a second extension extending laterally outward from a front end part of the first extension; and
a third extension extending in a front-to-back direction from the second extension.

2. The vehicle seat according to claim 1, wherein the back-and-forth movable body is a plate member.

3. The vehicle seat according to claim 1, wherein:
the back-and-forth movable body is a plate member; and
the backward protrusion is formed in a bent backward manner.

4. The vehicle seat according to claim 1, wherein:
the back-and-forth movable body is a plate member; and
the backward protrusion includes a first bent portion formed in a bent backward manner and a second bent portion formed to be bent forward from a rear end part of the first bent portion.

5. The vehicle seat according to claim 1, wherein the backward protrusion is formed at least in a laterally central part of the back-and-forth movable body.

6. The vehicle seat according to claim 1, wherein:
the backward protrusion is formed at least in a laterally central part of the back-and-forth movable body; and
the back-and-forth movable body has a greater vertical width in the laterally central part thereof than in lateral end parts thereof.

7. The vehicle seat according to claim 1, wherein
the back-and-forth movable body is a plate member;
the backward protrusion includes a first bent portion formed in a bent backward manner and a second bent portion formed to be bent forward from a rear end part of the first bent portion; and
a reverse side of a portion where the first and second bent portions are coupled has a backward protruding curved shape.

8. The vehicle seat according to claim 1, wherein
the third extension extends forward from the second extension.

9. The vehicle seat according to claim 1, wherein:
the link member is coupled directly to the third extension by way of a coupling shaft.

10. The vehicle seat according to claim 1, wherein:
a laterally central part and lateral end parts of the back-and-forth movable body are composed of respectively different members;
each lateral end part comprises a coupling plate member that is coupled to the link member by way of a coupling shaft, the coupling plate member arranged rearward of and coupled to either side of the laterally central part of the back-and-forth movable body; and
a vertical width on each side of the laterally central part of the back-and-forth movable body is greater than a vertical width of the coupling plate member.

11. The vehicle seat according to claim 10, wherein:
an end part of the coupling plate member is arranged rearward of either side of the laterally central part of the back-and-forth movable body; and
a second end part of the coupling plate member extends forward to be coupled to a lower end part of the link member.

12. The vehicle seat according to claim 10, wherein a diameter of the coupling shaft is smaller than a diameter of a link support shaft for supporting the link member on the side frame.

13. The vehicle seat according to claim 1, further comprising:
a coupling member for coupling the back-and-forth movable body and the link member;
wherein
the coupling member and the back-and-forth movable body are coupled by way of a shaft member having a shaft line in a front-to-back direction.

14. The vehicle seat according to claim 13, wherein a plurality of the shaft members are provided in a vertically arranged manner.

15. The vehicle seat according to claim 1, wherein lateral end parts of the back-and-forth movable body extend forward to be arranged closer to a seat front than a rear end part of the side frame.

16. The vehicle seat according to claim 1, wherein:
an inward extension extending laterally inward is formed at a front end part of the side frame; and
a link support shaft for supporting the link member on the side frame is provided rearward of the inward extension and positioned in an overlapped manner with the inward extension in a front-to-back direction.

17. A vehicle seat comprising:
a seat back frame having right and left side frames;
a headrest for supporting a head of a seat occupant; and
a back-and-forth movable body provided inside a backrest that is positioned at a rear of the seat occupant, wherein a backward movement of the back-and-forth movable body forwardly moves the headrest to support the head of the seat occupant;
wherein:
the back-and-forth movable body is attached to each side frame through a link member and is provided with a backward protrusion protruding backward;
the backward protrusion extends laterally;
the back-and-forth movable body is a plate member;
the backward protrusion includes a first bent portion formed in a bent backward manner and a second bent portion formed to be bent forward from a rear end part of the first bent portion; and
a reverse side of a portion where the first and second bent portions are coupled has a backward protruding curved shape.

18. The vehicle seat according to claim 17, wherein:
the back-and-forth movable body includes end extensions extending forward in lateral end parts thereof; and
a lower backward protrusion is formed away from the end extensions at a lower end part of the back-and-forth movable body.

19. The vehicle seat according to claim 18, wherein an upper backward protrusion opposed to the lower backward protrusion is formed at an upper end part of the back-and-forth movable body.

20. The vehicle seat according to claim 19, wherein the upper backward protrusion comprises:
a first bent portion formed in a bent backward manner; and
a second bent portion formed to be bent forward from a rear end part of the first bent portion.

21. The vehicle seat according to claim 17, wherein:
the back-and-forth movable body is a plate member; and
the backward protrusion is formed in an upper part of the back-and-forth movable body and comprises:
a first bent portion formed in a bent backward manner; and
a second bent portion formed to be bent forward from a rear end part of the first bent portion,
wherein the backward protrusion is formed away from end parts of the back-and-forth movable body opposed to the link member.

22. The vehicle seat according to claim 17, further comprising:
a bracket member for supporting the link member on the side frame;
wherein:
the back-and-forth movable body includes end extensions extending forward in lateral end parts thereof;
the end extensions and the bracket member are positioned opposite to each other; and
the backward protrusion is arranged at a same height as the bracket member.

23. The vehicle seat according to claim 17, wherein each lateral end part of the back-and-forth movable body comprises:
a first extension extending forward;
a second extension extending laterally outward from a front end part of the first extension; and
a third extension extending forward from the second extension.

24. The vehicle seat according to claim 17, wherein:
each lateral end part of the back-and-forth movable body comprises:
a first extension extending forward;
a second extension extending laterally outward from a front end part of the first extension; and
a third extension extending in a front-to-back direction from the second extension; and
the link member is coupled directly to the third extension by way of a coupling shaft.

25. The vehicle seat according to claim 17, wherein:
the backward protrusion is formed at least in a laterally central part of the back-and-forth movable body;
the back-and-forth movable body has a greater vertical width in the laterally central part thereof than in lateral end parts thereof; and
each lateral end part of the back-and-forth movable body comprises:
a first extension extending forward;
a second extension extending laterally outward from a front end part of the first extension; and
a third extension extending in a front-to-back direction from the second extension.

26. The vehicle seat according to claim 1, wherein:
the back-and-forth movable body includes end extensions extending forward in lateral end parts thereof; and
a lower backward protrusion is formed away from the end extensions at a lower end part of the back-and-forth movable body.

27. The vehicle seat according to claim 26, wherein an upper backward protrusion opposed to the lower backward protrusion is formed at an upper end part of the back-and-forth movable body.

28. The vehicle seat according to claim 27, wherein the upper backward protrusion comprises:
a first bent portion formed in a bent backward manner; and
a second bent portion formed to be bent forward from a rear end part of the first bent portion.

29. The vehicle seat according to claim 1, wherein:
the back-and-forth movable body is a plate member; and
the backward protrusion is formed in an upper part of the back-and-forth movable body and comprises:
a first bent portion formed in a bent backward manner; and
a second bent portion formed to be bent forward from a rear end part of the first bent portion,
wherein the backward protrusion is formed away from end parts of the back-and-forth movable body opposed to the link member.

30. The vehicle seat according to claim 1, further comprising:
a bracket member for supporting the link member on the side frame;
wherein:
the back-and-forth movable body includes end extensions extending forward in lateral end parts thereof;
the end extensions and the bracket member are positioned opposite to each other; and
the backward protrusion is arranged at a same height as the bracket member.

31. The vehicle seat according to claim 1, wherein:
the link member is coupled to the headrest via a transmission member; and
the transmission member comprises a rod member and a plurality of link members.

32. The vehicle seat according to claim 1, further comprising:
a headrest support member for supporting the headrest;
wherein:
the headrest supporting member includes a downward extension, the downward extension being coupled to first and second link members by way respectively of first and second coupling shafts;
the first and second link members being coupled to a bracket member by way respectively of first and second link support shafts; and
the first link member is coupled via a transmission member to the back-and-forth movable body that is arranged to be moved backward with a backward movement of the seat occupant.

33. A vehicle seat comprising:
a seat back frame having right and left side frames;
a headrest for supporting a head of a seat occupant; and
a back-and-forth movable body provided inside a backrest that is positioned at a rear of the seat occupant, wherein a backward movement of the back-and-forth movable body forwardly moves the headrest to support the head of the seat occupant;
wherein:
the back-and-forth movable body is attached to each side frame through a link member and is provided with a backward protrusion protruding backward in at least an end part in a vertical direction;
the backward protrusion extends laterally; and each lateral end part of the back-and-forth movable body comprises:
a first extension extending forward;
a second extension extending laterally outward from a front end part of the first extension; and
a third extension extending in a front-to-back direction from the second extension.

34. The vehicle seat according to claim 33, wherein:
the back-and-forth movable body is a plate member; and
the backward protrusion is formed in a bent backward manner.

35. The vehicle seat according to claim 33, wherein:
the backward protrusion is formed at least in a laterally central part of the back-and-forth movable body; and
the back-and-forth movable body has a greater vertical width in the laterally central part thereof than in lateral end parts thereof 36. The vehicle seat according to claim 33, wherein:
a laterally central part and lateral end parts of the back-and-forth movable body are composed of respectively different members;
each lateral end part comprises a coupling plate member that is coupled to the link member by way of a coupling shaft;
a vertical width on each side of the laterally central part of the back-and-forth movable body is greater than a vertical width of the coupling plate member;
an end part of the coupling plate member is arranged rearward of either side of the laterally central part of the back-and-forth movable body; and
a second end part of the coupling plate member extends forward to be coupled to a lower end part of the link member.

37. The vehicle seat according to claim 33, wherein:
each lateral end part of the back-and-forth movable body comprises:
a first extension extending forward;
a second extension extending laterally outward from a front end part of the first extension; and
a third extension extending in a front-to-back direction from the second extension; and
the link member is coupled directly to the third extension by way of a coupling shaft;
the back-and-forth movable body is a plate member;
the backward protrusion includes a first bent portion formed in a bent backward manner and a second bent portion formed to be bent forward from a rear end part of the first bent portion; and
a reverse side of a portion where the first and second bent portions are coupled has a backward protruding curved shape.

38. A vehicle seat comprising:
a seat back frame having right and left side frames;
a headrest for supporting a head of a seat occupant; and
a back-and-forth movable body provided inside a backrest that is positioned at a rear of the seat occupant, wherein a backward movement of the back-and-forth movable body forwardly moves the headrest to support the head of the seat occupant;
wherein:
the back-and-forth movable body is attached to each side frame through a link member and is provided with first and second backward protrusions protruding backward; and
the first and second backward protrusions extend laterally and are arranged in parallel with each other.

39. The vehicle seat according to claim 38, wherein:
the back-and-forth movable body is a plate member;
at least one of the first and second backward protrusions includes a first bent portion formed in a bent backward manner and a second bent portion formed to be bent forward from a rear end part of the first bent portion; and
a reverse side of a portion where the first and second bent portions are coupled has a backward protruding curved shape.

40. A vehicle seat comprising:
a seat back frame having right and left side frames;
a headrest for supporting a head of a seat occupant; and
a back-and-forth movable body provided inside a backrest that is positioned at a rear of the seat occupant, wherein a backward movement of the back-and-forth movable body forwardly moves the headrest to support the head of the seat occupant;
wherein:
the back-and-forth movable body is:
attached to each side frame through a link member;
provided with a first backward protrusion protruding backward in an upper end part thereof; and
provided with a second backward protrusion protruding backward in a lower end part thereof; and
the first and second backward protrusions extend laterally.

41. The vehicle seat according to claim 40, wherein the first and second backward protrusions are formed at least in a laterally central part of the back-and-forth movable body and are arranged in parallel with each other.

42. The vehicle seat according to claim 40, wherein:
the back-and-forth movable body is a plate member; and
each of the first and second backward protrusions is formed in a bent backward manner.

43. The vehicle seat according to claim 40, wherein:
the first and second backward protrusions are formed in a laterally central part of the back-and-forth movable body and are arranged in parallel with each other; and
lateral end parts of the back-and-forth movable body where the second backward protrusion is not provided extend forward.

44. The vehicle seat according to claim 40, wherein:
the first and second backward protrusions are formed at least in a laterally central part of the back-and-forth movable body; and
each lateral end part of the back-and-forth movable body comprises:
a first extension extending forward;
a second extension extending laterally outward from a front end part of the first extension; and
a third extension extending in a front-to-back direction from the second extension.

45. The vehicle seat according to claim 40, wherein:
lateral end parts of the back-and-forth movable body extend forward and are arranged closer to a seat front than a rear end part of the side frame;
an inward extension extending laterally inward is formed at a front end part of the side frame; and
a link support shaft for supporting the link member on the side frame is provided rearward of the inward extension and positioned in an overlapped manner with the inward extension in a front-to-back direction.

46. The vehicle seat according to claim 40, wherein:
the back-and-forth movable body is a plate member;
the first backward protrusion includes a first bent portion formed in a bent backward manner and a second bent portion formed to be bent forward from a rear end part of the first bent portion; and
a reverse side of a portion where the first and second bent portions are coupled has a backward protruding curved shape.

47. A vehicle seat comprising:
a seat back frame having right and left side frames;
a headrest for supporting a head of a seat occupant; and
a back-and-forth movable body provided inside a backrest that is positioned at a rear of the seat occupant, wherein a backward movement of the back-and-forth movable body forwardly moves the headrest to support the head of the seat occupant;
wherein:
the back-and-forth movable body is attached to each side frame through a link member and is provided with a backward protrusion protruding backward;
the backward protrusion extends laterally;
the back-and-forth movable body includes end extensions extending forward in lateral end parts thereof; and
a lower backward protrusion is formed away from the end extensions at a lower end part of the back-and-forth movable body.

48. The vehicle seat according to claim 47, wherein an upper backward protrusion opposed to the lower backward protrusion is formed at an upper end part of the back-and-forth movable body.

49. The vehicle seat according to claim 48, wherein the upper backward protrusion comprises:
a first bent portion formed in a bent backward manner; and
a second bent portion formed to be bent forward from a rear end part of the first bent portion.

50. The vehicle seat according to claim 47, wherein:
the back-and-forth movable body is a plate member; and
the backward protrusion is formed in an upper part of the back-and-forth movable body and comprises:
a first bent portion formed in a bent backward manner; and
a second bent portion formed to be bent forward from a rear end part of the first bent portion,
wherein the backward protrusion is formed away from end parts of the back-and-forth movable body opposed to the link member.

51. The vehicle seat according to claim 47, further comprising:
a bracket member for supporting the link member on the side frame;
wherein:
the back-and-forth movable body includes end extensions extending forward in lateral end parts thereof;
the end extensions and the bracket member are positioned opposite to each other; and
the backward protrusion is arranged at a same height as the bracket member.

52. A vehicle seat comprising:
a seat back frame having right and left side frames;
a headrest for supporting a head of a seat occupant; and
a back-and-forth movable body provided inside a backrest that is positioned at a rear of the seat occupant, wherein a backward movement of the back-and-forth movable body forwardly moves the headrest to support the head of the seat occupant;
wherein:
the back-and-forth movable body is attached to each side frame through a link member and is provided with a backward protrusion protruding backward; and
the backward protrusion extends laterally the vehicle seat further comprising:
a bracket member for supporting the link member on the side frame;
wherein:
the back-and-forth movable body includes end extensions extending forward in lateral end parts thereof;
the end extensions and the bracket member are positioned opposite to each other; and
the backward protrusion is arranged at a same height as the bracket member.

53. The vehicle seat according to claim 52, wherein:
each of the end extensions comprises:
a first extension extending forward;
a second extension extending laterally outward from a front end part of the first extension; and
a third extension extending in a front-to-back direction from the second extension; and
the link member is coupled directly to the third extension by way of a coupling shaft.

54. The vehicle seat according to claim 52, wherein:
each lateral end part of the back-and-forth movable body comprises:
a first extension extending forward;
a second extension extending laterally outward from a front end part of the first extension; and
a third extension extending in a front-to-back direction from the second extension;
the link member is coupled directly to the third extension by way of a coupling shaft;
the back-and-forth movable body is a plate member;
the backward protrusion includes a first bent portion formed in a bent backward manner and a second bent portion formed to be bent forward from a rear end part of the first bent portion; and
a reverse side of a portion where the first and second bent portions are coupled has a backward protruding curved shape.

* * * * *